(12) United States Patent
Troia et al.

(10) Patent No.: US 6,671,659 B2
(45) Date of Patent: Dec. 30, 2003

(54) SYSTEM AND METHOD FOR MONITORING CONTROLLER DIAGNOSTICS

(75) Inventors: Terry A. Troia, Roanoke, VA (US);
Kenneth W. Boggs, Roanoke, VA (US);
Patrick J. Conroy, Roanoke, VA (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/681,924

(22) Filed: Jun. 27, 2001

(65) Prior Publication Data

US 2003/0004685 A1 Jan. 2, 2003

(51) Int. Cl.[7] .................................................. G06F 3/00
(52) U.S. Cl. ........................ 702/188; 702/180; 702/182; 702/183; 702/186
(58) Field of Search ................................ 702/119, 120, 702/122, 123, 180, 182, 183, 186, 188; 709/108; 714/31, 37

(56) References Cited

U.S. PATENT DOCUMENTS

| | | |
|---|---|---|
| 3,934,128 A | 1/1976 | Uram |
| 4,455,614 A | 6/1984 | Martz et al. |
| 4,455,820 A | 6/1984 | Buckley, Jr. et al. |
| 4,992,946 A | 2/1991 | Butz et al. |
| 5,184,456 A | 2/1993 | Rumford et al. |
| 5,197,280 A | 3/1993 | Carpenter et al. |
| 5,995,916 A * | 11/1999 | Nixon et al. ................. 702/182 |
| 6,026,352 A * | 2/2000 | Burns et al. ................. 702/182 |
| 6,145,098 A * | 11/2000 | Nouri et al. .................. 714/31 |
| 6,298,454 B1 * | 10/2001 | Schleiss et al. ............... 714/37 |

* cited by examiner

*Primary Examiner*—Marc S. Hoff
*Assistant Examiner*—Felix Suarez
(74) *Attorney, Agent, or Firm*—Karl Vick; Kevin Duncan; Hunton & Williams LLP

(57) ABSTRACT

The invention provides a diagnostic method and system for monitoring controller performance. The diagnostic system includes a tool and a controller. The tool includes a user interface that displays at least one operational status command, such that a user may select the operational status command. A controller has an operation status. The operational status command of the tool queries the operation status of the controller. As a result, the controller generates at least one operational status response. A communications path for transmission of the at least one operational status command from the tool to the controller and the at least one operational status response from the controller to the tool is provided. The user interface displays the operational status response of the controller.

26 Claims, 13 Drawing Sheets

SYSTEM AND METHOD FOR MONITORING CONTROLLER DIAGNOSTICS

BACKGROUND OF THE INVENTION

The invention is directed to a system and method for requesting and obtaining diagnostic information from a controller device.

In the environment of embedded controllers it is often a difficult and manual task to get diagnostic information from a controller to the tool that controls that controller. Typically, an engineer must establish a communication session to the controller such as a TELNET session using the Internet or an Ethernet, or alternatively, with terminal emulator technology using RS232 (Recommended Standard 232). TELNET is a terminal emulation protocol that is commonly used over the Internet. TELNET technology allows a user to log onto a program and run that program from a remote computer or terminal.

Once a communication session connection has been established between a tool and a controller device, the engineer manually submits diagnostic commands to the controller and waits for feedback These diagnostic commands are in a low level command language. Thus, the commands are not intuitive and often the engineers must be prompted by the controller manufacturer to input the necessary commands. Further, since the commands are entered manually the process is time-consuming and prone to typing errors.

Once commands are entered, the engineer must wait for feedback from the controller. The feedback regarding the query controller status is displayed to the engineer, or, is not typically in a form that can be readily forwarded electronically for storage or transmission to a remote destination for further evaluation.

Thus, the known systems and methods for obtaining diagnostic information from a controller provide a cumbersome and inefficient method of querying the controller status and do not practically provide for electronic transmission of controller responses.

SUMMARY OF THE INVENTION

It would be desirable to provide a method and system for effectively troubleshooting controller problems which allows engineers to quickly and accurately collect diagnostic data from the controller. It would also be desirable to minimize the opportunity for damage to the controller due to typing errors in a command requesting diagnostic information from the tool.

The present invention overcomes the disadvantages of the known systems and provides additional advantages by providing a method and a system for automated acquisition of diagnostic information from a controller. The user selects an operational status command from a tool. The operational status command is transmitted to the controller. The controller executes the operational status command and the controller obtains an operational status response. The operational status response is transmitted to the tool. An operational status report is displayed.

BRIEF DESCRIPTION OF THE DRAWINGS

The present invention can be more fully understood by reading the following detailed description of the presently preferred embodiments together with the accompanying drawings, in which like reference indicators are used to designate like elements and in which.

DETAILED DESCRIPTION OF THE INVENTION

The system and method of the invention provide an efficient manner for engineers or other users working at a tool to collect diagnostic information from a controller, which is in communication with the tool. As used herein "diagnostic information" includes a wide variety of information regarding operation in the controller device including performance information, information regarding process problems in the controller device, or any other information regarding operations of the controller device. Further, the system and method of the invention minimize the need for user familiarity with complex commands, minimizes the chance for typographical error that could damage controller function and facilitates transmission of diagnostic information. Further aspects and advantages of the present invention are described below.

In accordance with one embodiment of this system and method of the invention, the user accesses a tool, which is in communication with a controller. The tool might be characterized as an interface to the controller. The user is provided menu choices of controller status commands in the tool. The controller status commands may include a standard or static set of choices, or alternatively, customized choices which are customized for a particular user's needs, or both. The commands are encapsulated such that a single or minimal number of key strokes or mouse clicks makes the selection of an entire controller status command. Once the user has selected a desired controller status command, the controller status command is transmitted to the controller from the tool by a communications path. The controller executes the operational status command and obtains an operational status response. The operational status response is transmitted from the controller to the tool using the communications path. Once received, the response is displayed by the controller as a report, for example. The report is presented to a user in a user readable format. The report may be further printed or transferred electronically for archiving or be transmitted by email to a remote site for further evaluation.

Figure 1:
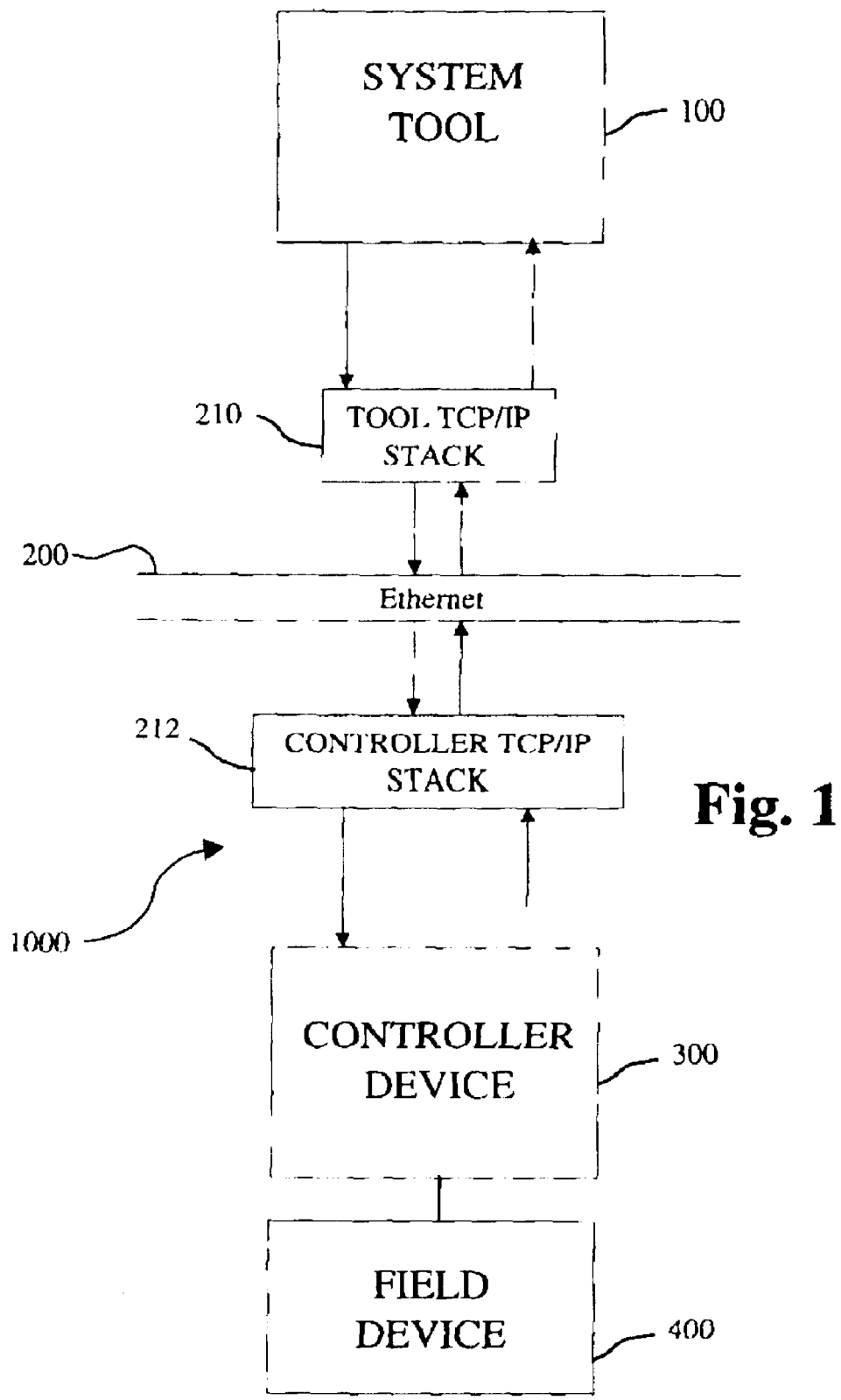
FIG. 1 is a block diagram showing an arrangement of a system tool and a controller device in accordance with one embodiment of the system and method of the invention.

FIG. 1 is a block diagram in accordance with one embodiment of the system and method of the invention. Specifically, FIG. 1 illustrates a network system 1000. The network system 1000 includes a system tool 100 and a controller device 300. The network system 1000 also includes an operating field device 400. The system tool 100 and the controller device 300 are connected to each other over an Ethernet 200. A human user interacts with the system tool 100 to monitor and control operations the controller device 300. In turn, the controller device 300 controls the operating field device 400. For example, the operating field device 400 may be a gas or hydrodynamic power generation device. Further, while an Ethernet 200 is illustrated, it should be appreciated that any suitable communication network may be used to allow communication between the system tool 100 and the controller device 300.

As shown in FIG. 1, the system tool 100 is connected to the Ethernet 200 utilizing a tool TCP/IP stack 210. The controller device 300 is connected to the Ethernet 200 utilizing a controller TCP/IP stack 212. Also, the controller device 300 is connected to the operating field device 400. The controller device 300 may communicate with the operating field device 400 in any suitable manner, such as direct connection, utilizing a Local Area Network (LAN) or over the Internet, for example.

It should be appreciated that the TCP/IP stack 210, the Ethernet 200 and a controller responsive TCP/IP stack 212 are merely illustrative. As one should appreciate, TCP/IP (transmission control protocol/Internet protocol) is a well known protocol used in Internet communication, for example. As is known in the art, TCP provides the protocol with regard to transport functions, which ensures that the total amount of data, i.e., bytes, transmitted is correctly received at the receiving end. On the other hand, IP provides the routing mechanism.

The system tool 100 uses the tool responsive TCP/IP stack 210 to encapsulate a command, create a packet containing the command and send the command out over the Ethernet 200. A packet is a block of data that is used for transmission between a sending end and a receiving end in packet switched systems. The controller TCP/IP stack 212 accepts the packet from the Ethernet 200 and unwraps the packet. The command is then executed in the controller device 300 and the controller response is created. Thereafter the controller TCP/IP stack 212 encapsulates the controller response and sends the controller response back out over the Ethernet 200. The tool responsive TCP/IP stack 210 accepts the controller response and unpacks the controller response for display in the system tool 100.

Thus, the TCP/IP stacks are exemplary embodiments using a protocol that may be used for transmission of the encapsulated commands. However, other protocols of handling packets of data may also be used in the practice of the invention. Further, an Ethernet is an exemplary embodiment of one of the types of networks that may be used in the practice of the invention. Accordingly, it should be appreciated that any suitable medium of communication may be utilized to provide communication between the tool 100 and the controller 300.

Figure 2:
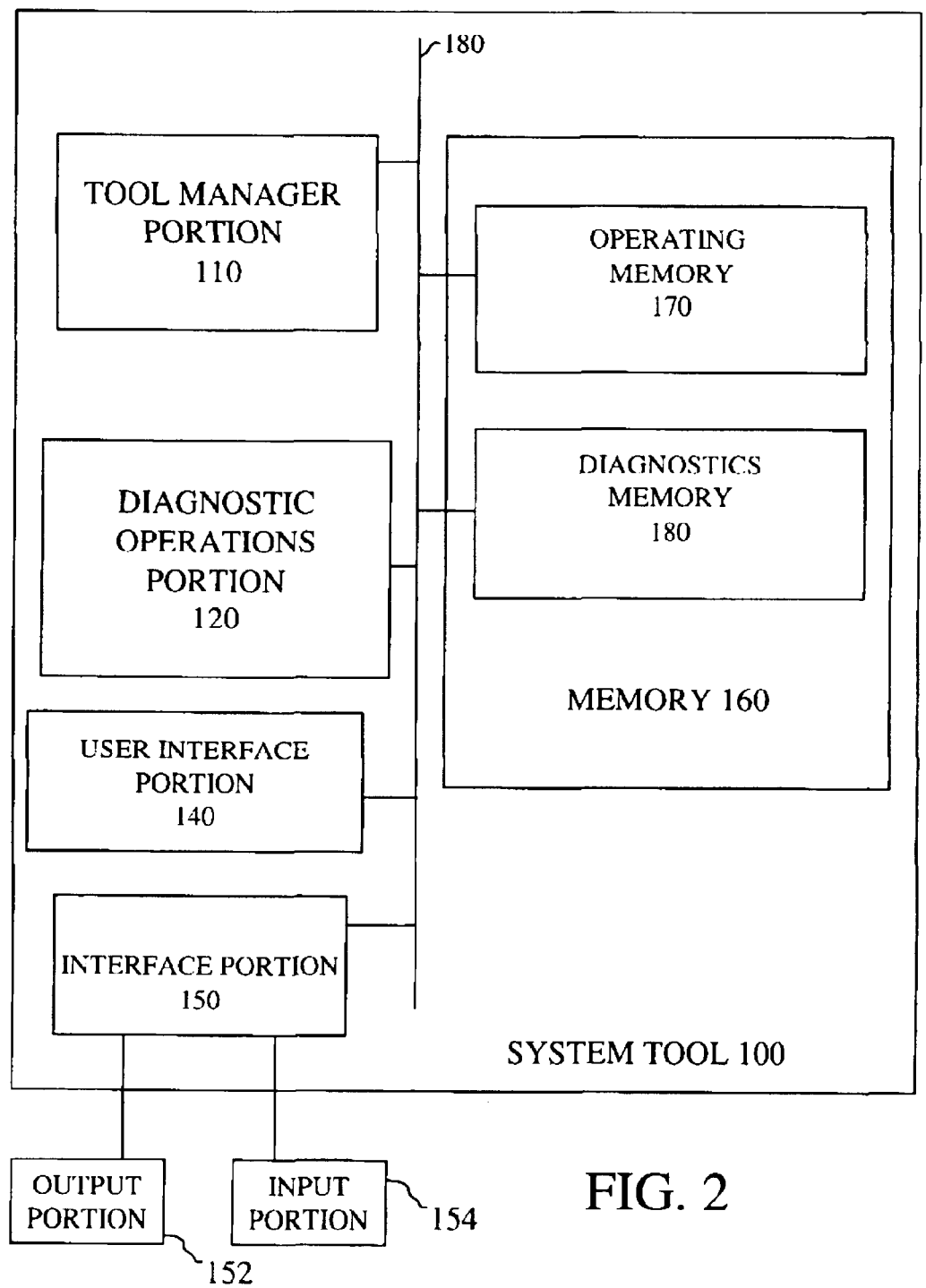
FIG. 2 is a block diagram showing the system tool in further detail in accordance with one embodiment of the system and method of the invention.

FIG. 2 is a block diagram illustrating further details of the system tool 100. As shown in FIG. 2, the system tool includes a tool manager portion 110, a diagnostic operations portion 120, a user interface portion 140, an interface portion 150 and a memory 160. Each of the tool manager portion 110, the diagnostic operations portion 120, the user interface portion 140, the interface portion 150 and the memory 160 are connected and communicate with each other utilizing a data link 180. For example, the data link 180 may be in the form of a databus between the various components of the system tool 100.

The tool manager portion 110 controls and monitors the overall operations of the system tool 100. The system tool 100 also includes various operating components. In accordance with one embodiment of the method and system of the invention, the system tool 100 includes the diagnostics operations portion 120, as shown in FIG. 2. The diagnostic operations portion 120 performs various operations in accordance with one embodiment of the method and system of the invention, as are described with reference to FIG. 3 below.

Figure 3:
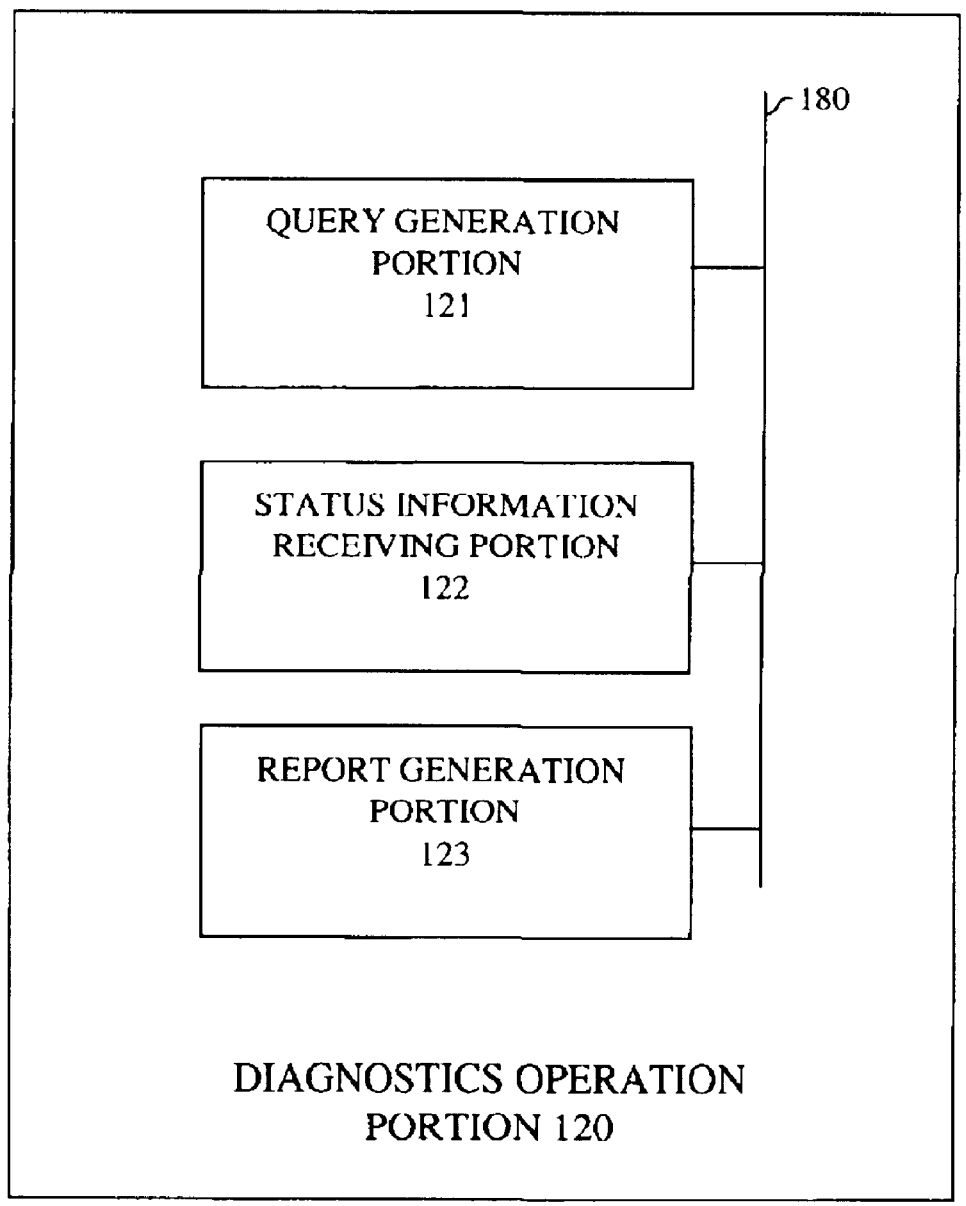
FIG. 3 is a block diagram showing the diagnostics operation portion of the system tool in further detail in accordance with one embodiment of the system and method of the invention.

The system tool 100 as shown in FIG. 3, also includes a user interface portion 140. The user interface portion 140 provides communication to and from a human user. For example, the user interface portion 140 may be in the form of a computer monitor and a keyboard and mouse. Illustratively, the user interface portion 140 generates the user interfaces shown in FIGS. 5–7 described below. Further, it should be appreciated that the user interface portion 140 may also include a printer (not shown) or a suitable link to an e-mail communication for forwarding a desired report.

Further, the system tool 100 also includes the interface portion 150. The interface portion 150 is connected to an output portion 152 and an input portion 154. The output portion 152 and the input portion 154 interface with the tool TCP/IP stack 210 as shown in FIG. 1.

The tool 100 also includes a memory 160. The memory 160 includes an operating memory 170 and a diagnostics memory 180. As shown in FIG. 2, the operating memory 170 is a memory storage for general use by the system tool 100 and may be used to contain programs or database information, for example, needed for overall operations of the system tool 100.

The memory 160 also includes a diagnostic memory 180. The diagnostic memory 180 is a memory portion designated for operations in conjunction with the diagnostic operations portion 120. The diagnostic memory 180 includes a diagnostic command files portion 182 and a data storage portion 184, as described with reference to FIG. 4 below.

FIG. 3 is a block diagram showing in further detail the diagnostic operations portion 120. As shown in FIG. 3, the diagnostic operations portion 120 includes a query generation portion 121, a status information receiving portion 122, and a report generation portion 123. As shown in FIG. 3, the query generation portion 121, the status information receiving portion 122, and the report generation portion 123 are all connected and communicate with each other utilizing the data link 180.

The various operating components of the tool 100 perform various operations in accordance with one embodiment of the system and method of the invention. The query generation portion 121 works in conjunction with the user interface portion 140 to generate a query regarding a condition of the controller device 300. This query is then transmitted to the controller device 300 over the Ethernet 200. The status information receiving portion 122 receives and processes a response for the query from the controller device 300. The report generation portion 123 uses information received from the controller device 300 and/or stored in the memory 160 to generate reports for review by a user.

Figure 4:
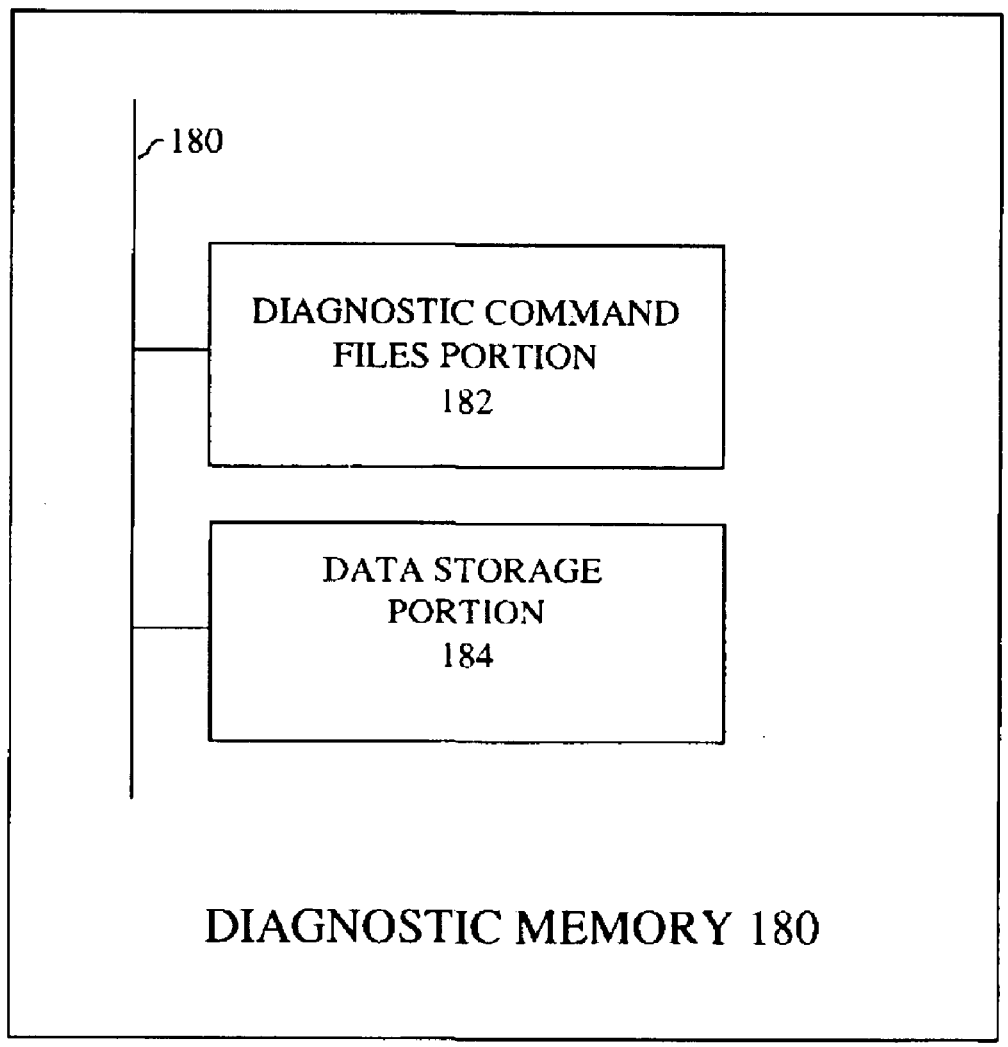
FIG. 4 is a block diagram showing the diagnostics memory of the system tool in further detail in accordance with one embodiment of the system and method of the invention.

FIG. 4 is a block diagram showing in further detail the diagnostics memory 180. As shown in FIG. 4, the memory 180 includes sub-memories. Specifically, the diagnostics memory 180 includes a diagnostic command files portion 182 and a data storage portion 184. The diagnostic command files portion 182 in the memory 180 contains various diagnostic commands, as are described in detail below. Further, the data storage portion 184 stores various information resulting from diagnostic operations performed by the tool 100, i.e., including data utilized by the report generation portion 123.

Figure 5:
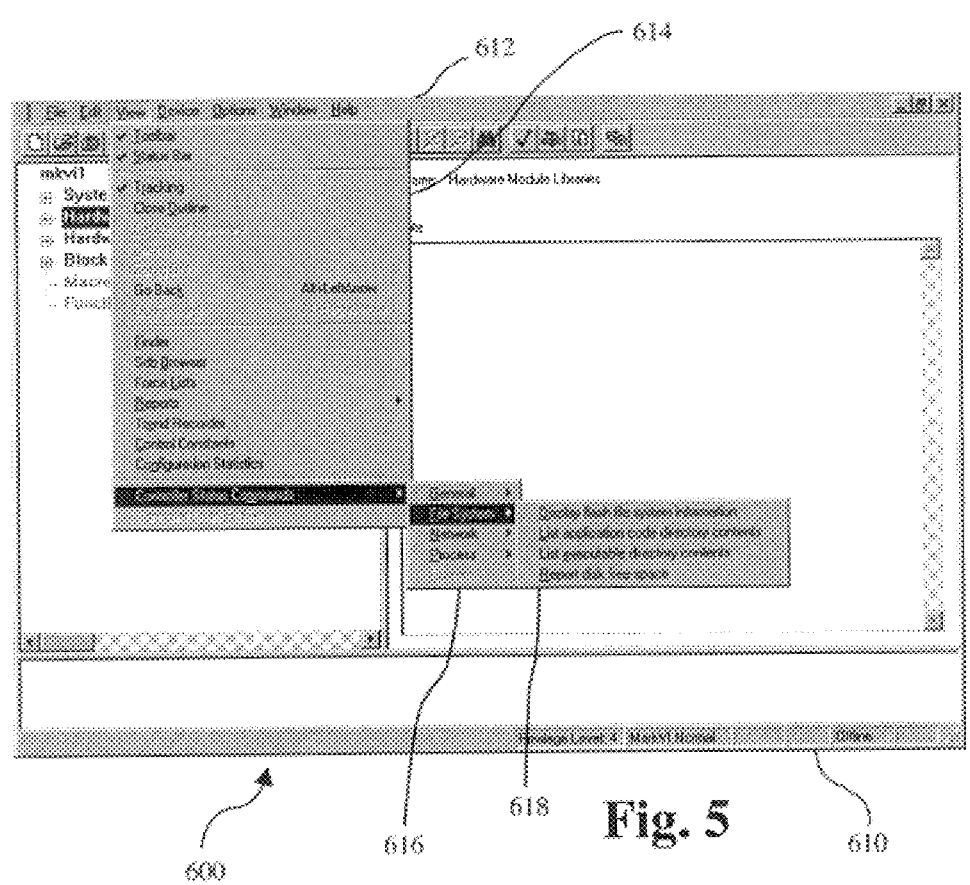
FIG. 5 is a diagram showing an illustrative user interface in accordance with one embodiment of the system and method of the invention.

FIG. 5 is a screen shot showing a user interface screen 600 in accordance with one embodiment of the system and method of the invention. The user interface screen 600 is in the form of a tool window 610. The tool window 610 is generated by the user interface portion 140 in the system tool 100. The tool window 610 includes a menu bar 612. The menu bar 612 permits a user to access various tool features of the system tool 100. These various tool features may include a wide variety of features, in addition to the controller diagnostic features described herein.

When a user is interested in accessing the diagnostic features in accordance with one embodiment of the present invention, the user selects View
→
Controller Status Commands
→
File System using the Menu Bar 612 as Shown in FIG. 5. This selection allows a user to access both sub-menu 616 and sub-menu 618. These sub-menus (616, 618) permit selection of various controller status commands. Further, it should be appreciated that the items displayed in the sub-menus (616, 618) are in the form of "natural language" dialogue. The natural language presentation of the various selections provide ease of use by a user.

The selection of "file system" in the submenu 616, generates the submenu 618, which provides a user with a variety of options. Specifically, these options include Display Flash File System Information, List Application Code Directory Contents, List Executable Directory Contents, and Report Disk Free Space. These various selections in the submenu 616 represent diagnostic queries which, when selected by a user, activate the query generation portion 121 in the diagnostic operations portion 120.

Specifically, in response to the selection, the query generation portion 121 generates a query and forwards that query over the Ethernet 200 to the controller device 300. As a result to receiving the query, the controller device 300 processes the command to generate the desired information. The controller device 300 transmits the desired information back over a communications path 200 to the tool 100. The response from the controller device 300 is received by the status information receiving portion 122. Working in conjunction with the user interface portion 140, the status information receiving portion 122 provides the information contained in the response to a user. Accordingly, it should be appreciated that a simple selection using the items in the submenu 618 quickly and easily provide a user with important diagnostic information relating to operations of the controller device 300.

Accordingly, the "File System" selection shown in the submenu 616 described above is one illustrative controller status command. However, as shown in FIG. 5, the submenu 616 shows additional types of controller status commands, each of which will generate a further submenu. For example, the submenu 616 also includes a "General" selection, a "Network" selection, a "Process" selection, and a "Custom" selection. It should be appreciated that each of the general, file system, network and process status commands are static controller status commands. Static commands are a standard set of commands and typically query the controller device 300 regarding such operational matters such as file system information, a request to list application code directory contents, a request to list executable directory contents, a request for information regarding free disk space, as well as other queries relating to the operation of the controller device 300. However, the static diagnostic commands, which might be utilized by a user, are not limited to those set forth in FIG. 5. Rather, additional diagnostic commands may be provided as are necessary or desirable.

In contrast to static diagnostic commands described above, the diagnostic operations portion 120 also provides for the utilization of custom diagnostic commands.

In accordance with one embodiment of the method and system of the invention, custom diagnostic commands are created by a user utilizing the diagnostic operations portion 120, and specifically the query generation portion 121, in order to address a request or need of a particular user. In accordance with one embodiment, in order to create a custom diagnostic command, a user may utilize a suitable text editor to create the desired command. The custom diagnostic command may be distinguished from other text files by utilizing a suitable designated file extension, for example. For example, a suitable file extension such as ".SCP" may be used. Alternatively, the custom diagnostic command code may be simply stored in a predetermined location. Once the custom diagnostic command is created by a user, the custom diagnostic command is then enabled by a system administrator or other person who oversees operations of the system tool 100. In other words, the system administrator confirms that the custom diagnostic command is proper and thereafter enables the custom diagnostic command. To explain further, it should be appreciated that a privilege scheme may be implemented. That is, various persons may have different privileges, i.e., access capabilities, so as to enable a custom diagnostic command, for example, or perform other operations. Thus, the system administrator may have the highest level of privilege, whereas an engineer working with the system tool would have more limited capabilities.

It should be appreciated that enablement of the custom diagnostic command by a system administrator addresses concerns relating to errors in the custom diagnostic command. For example, these errors might otherwise result from a inexperienced user utilizing an incorrect code format or entering a diagnostic command containing a typographical error. It should be appreciated that errors in diagnostic commands, and specifically in custom diagnostic commands, may cause a variety of problems if transmitted from the system tool 100 to the controller device 300. For example, the introduction of typographical errors may result in damage to the controller device 300. At the least, the user may not receive the diagnostic information that user requested. Other concerns associated with erred diagnostic commands include excessive consumption of processing time in the controller device 300 or even possible shutdown of the controller device 300. Further, the enablement of the custom diagnostic commands by the system administrator allows the user to avoid the complexity associated with formulating the command. Formulation of the command is often complex since the command must be in a language recognized by the controller.

Figure 6:
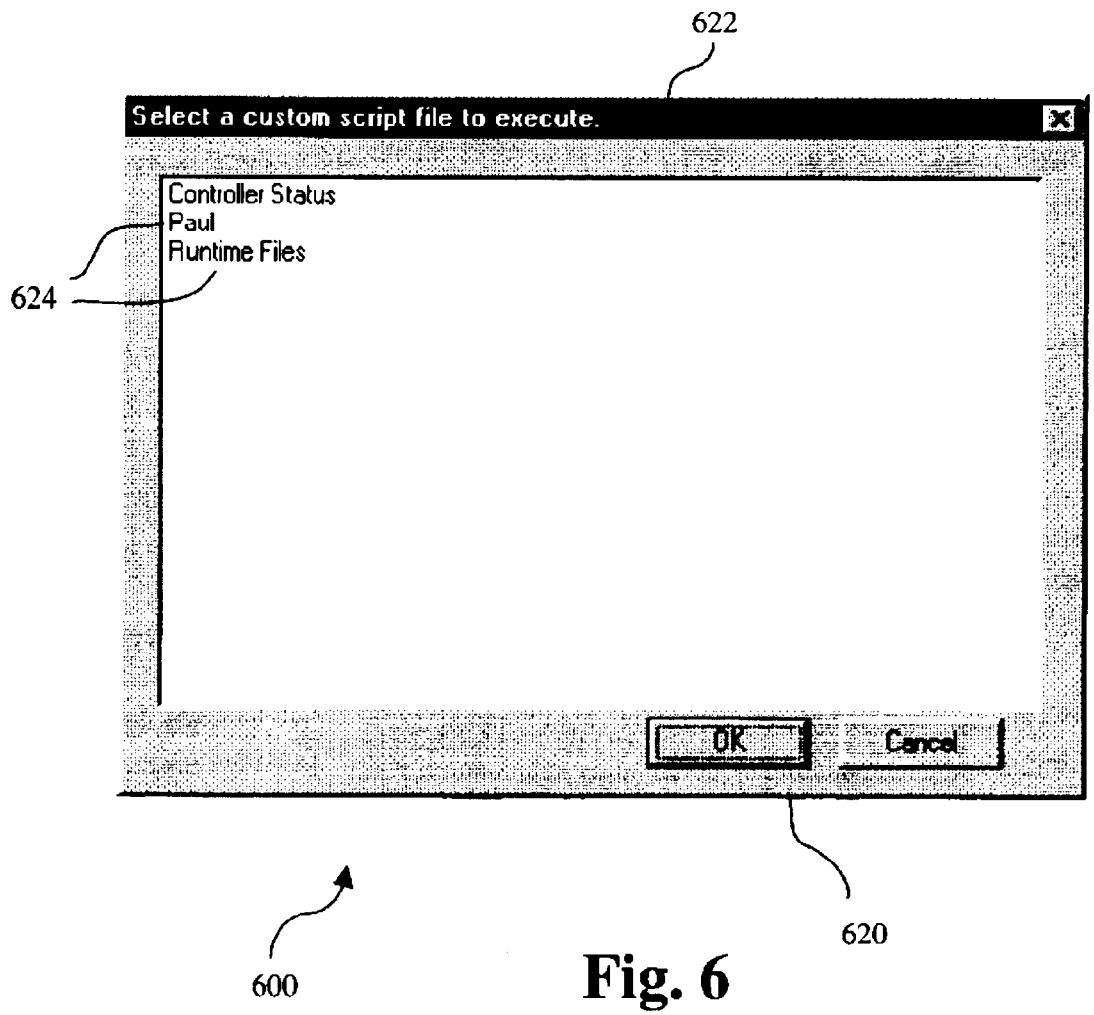
FIG. 6 is a diagram showing an illustrative custom diagnostic command window in accordance with one embodiment of the system and method of the invention.

In accordance with one embodiment of the method and system of the invention, a user may select a custom diagnostic command from a menu list, in a manner similar to selection of the static diagnostic commands. For example, a user may select the "Custom selection" in the submenu 616. In response to this selection, the query generation portion 121, working in conjunction with the user interface portion 140, generates a user interface screen 600 as shown in FIG. 6. The user interface screen 600 of FIG. 6 is in the form of a custom diagnostic command window 620.

As shown in FIG. 6, the custom diagnostic command window 620 prompts a user to "select a custom script file to execute" as shown in the title bar 622. A user may select from various custom diagnostic commands 624 shown in the custom diagnostic command window 620. Each of the custom diagnostic commands 624 were created specifically for a particular user. Illustratively, the command "controller status" may be a request to obtain only operating parameters of the controller device 300 that the particular user is interested in. Further, the custom diagnostic command "Paul" may, for example, request information from the controller device 300 relating to down time. The method and system of the invention allows a user, working in conjunction with a system administrator, to add custom diagnostic commands to the window 620 as is necessary or desired.

In accordance with one embodiment of the method and system of the invention, the tool 100 also utilizes a "file send to mechanism." The file send to mechanism works in conjunction with the custom scripts. Specifically, a first user at a first location may be talking to a second user at a second location. The first user is experiencing difficulties. However, the second user believes that she knows what the problem experienced by the first user is. However, the second user realizes that certain diagnostic tests must be run. Further, the second user possesses the code to run these diagnostic tests. As a result, the second user may e-mail the necessary code to the first user. Upon receiving the code, the first user inserts the code into a custom script file. The first user may then select that diagnostic command generated by the newly added code to run the diagnostic processing that was suggested by the second user. However, it should be appreciated that the first user does not need to understand or even be aware of this particular code utilized in the newly added diagnostic command.

Figure 7:
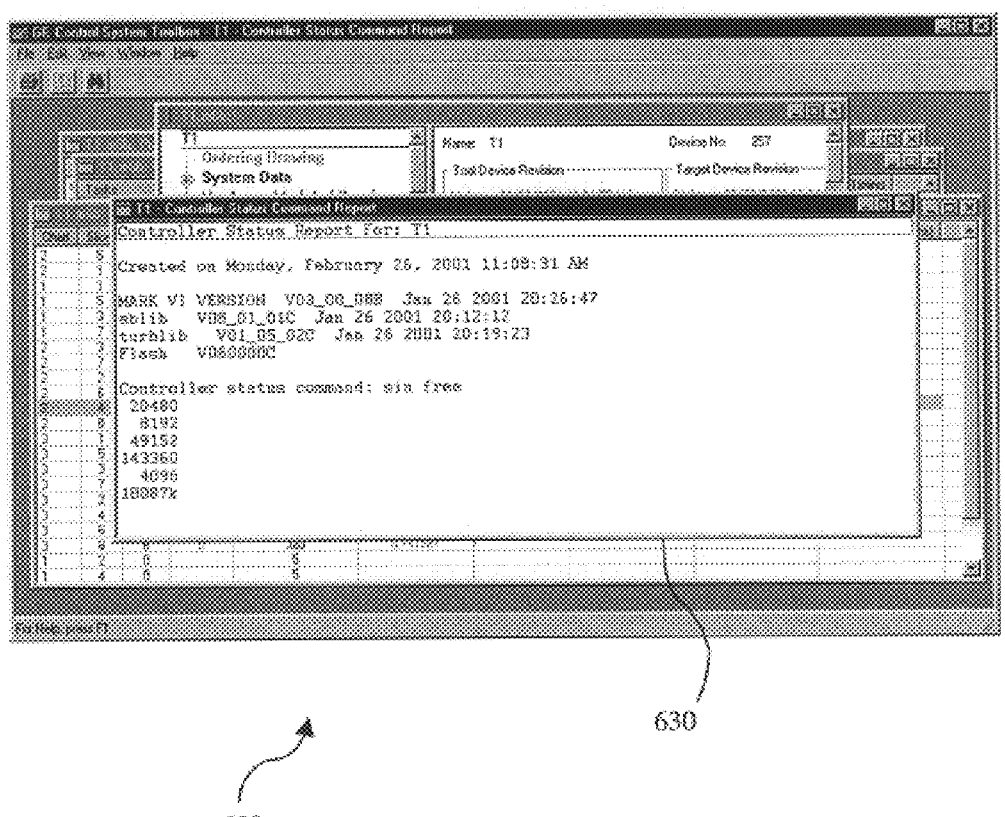
FIG. 7 is a diagram showing an illustrative report window in accordance with one embodiment of the system and method of the invention.

As shown in FIG. 7, a report window 630 generated by the report generation portion 123 presents the results of the controller response in accordance with one embodiment of the method and system of the invention. As shown in the report window 630, the controller response may be presented in the form of a custom report. As one skilled in the art will appreciate, the specific content and format of the report may include various amounts and types of information, as well as be presented in a variety of formats. Accordingly, the content and format of the reports displayed by the report window 630 is subject to wide variation as may be necessary or desired. For example, the exemplary report shown in FIG. 7, includes the date and time of creation of the report, the requested controller information specifying the controller status command used, as well as identification of the controller query.

The report generation portion 123 may, for example, generate the report in conjunction with the user interface portion 140. Alternatively, the content of the report shown in the report window 630 may be forwarded to a printer to create a printed copy of the report, sent to the data storage portion 184 or another suitable memory for archiving, or sent via e-mail to a remote site for further evaluation.

Figure 8:
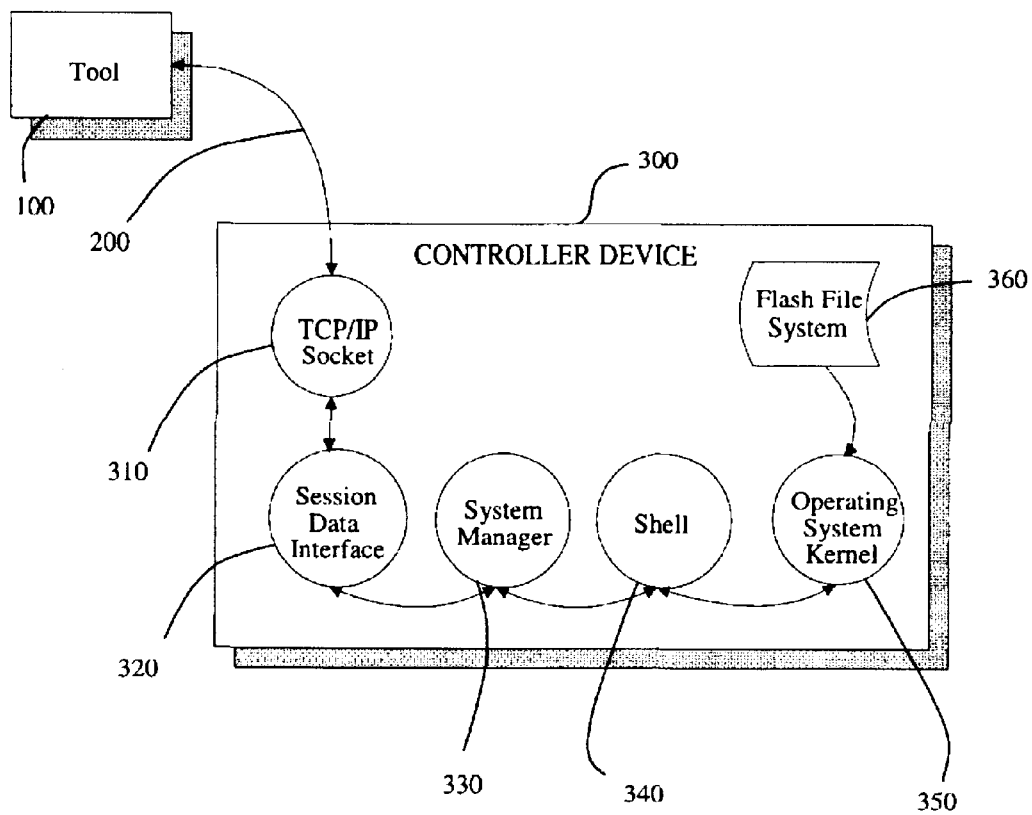
FIG. 8 is a diagram showing the controller of FIG. 1 in further detail in accordance with one embodiment of the system and method of the invention.

FIG. 8 is a block diagram showing the network system in further detail, and in particular the controller device 300. As shown in FIG. 8, the controller device 300 includes a TCP/IP socket 310, a session data interface (SDI) 320, a system manager 330, a shell 340, an operating system kernel 350 and a flash file system 360. Each of these components may be in communication with each other in any suitable manner, such as by using a databus.

The TCP/IP socket 310, working in conjunction with the controller TCP/IP stack 212, provides the connection between the controller device 300 and the communications pathway, i.e., the Ethernet 200. The TCP/IP socket 310 receives the controller diagnostic commands and sends the response to any given diagnostic command.

To explain further, the TCP/IP socket interacts with the data session interface 320. The data session interface 320 establishes communications with the system manager 330. System manager 330 forwards the controller diagnostic commands to one of the shell 340, operating system kernel 350, or flash file system 360, for example. The shell 340, operating system kernel 350 and flash file system 360 are the portions of the controller having the performance and/or status information requested by the controller diagnostic command. Controller response to the controller diagnostic command query are generated by the shell 340, operating system kernel 350 or flash file system 360 and sent to the system manager 330. The controller responses are then forwarded to the session data interface 320 and TCP/IP socket 310 for communication to the tool 100 via the communications path 200.

Figure 9:
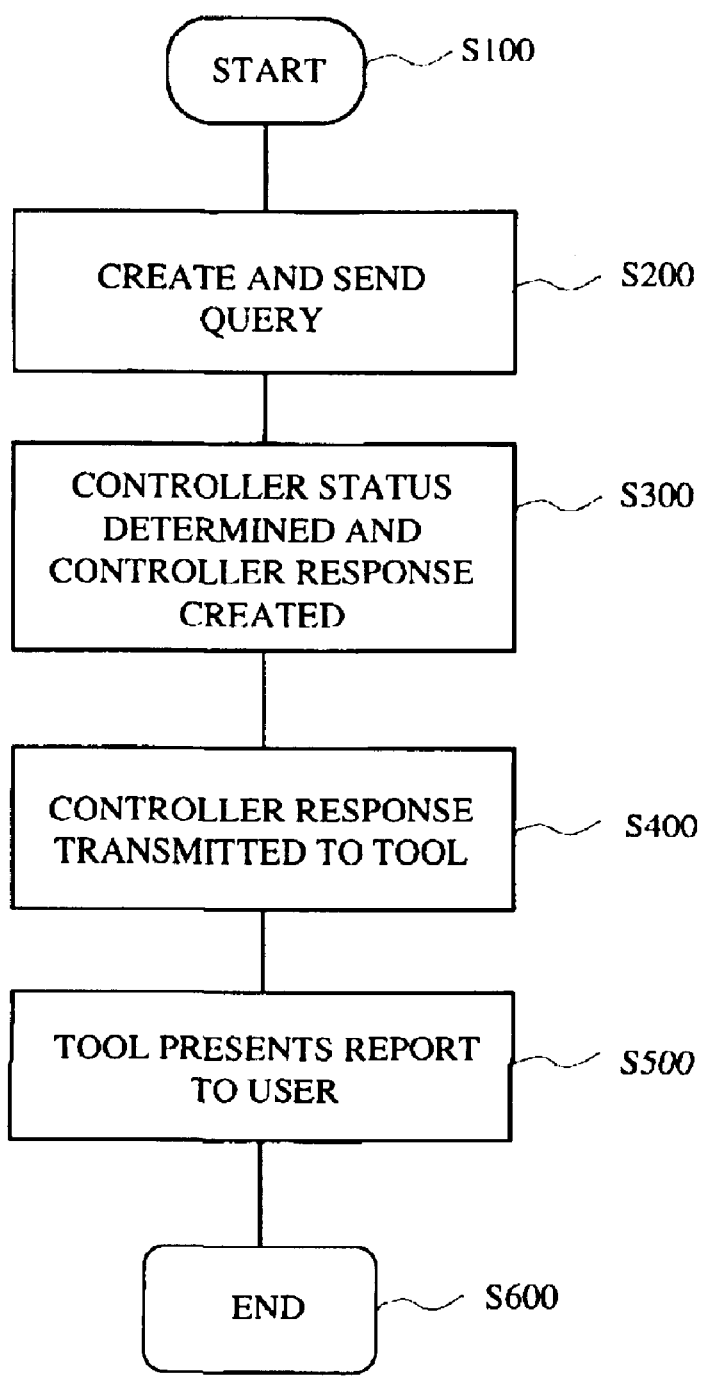
FIG. 9 is a flowchart showing a method of monitoring a controller device using a tool in accordance with one embodiment of the system and method of the invention.

FIGS. 9–13 are flowcharts showing an illustrative implementation in accordance with one embodiment of the invention. FIG. 9 is a high level flowchart showing aspects of the invention. As shown in FIG. 9, the process of gathering diagnostic information from the controller device 300 is initiated in step S100. After step S100, the process passes to step S200. In step S200, the system tool 100, and specifically the diagnostic operations portion 120 creates and sends a query to the controller device 300. After step S200, the process passes to step S300. In step S300, the status of the controller is determined and a suitable response is created by the controller device 300. Then, the process passes to step S400.

In step S400, the response prepared by the controller device 300 is transmitted to the system tool 100. Then, the system tool 100 presents a report to a user in response to the query generated in step S200, described above.

After step S500, the process passes to step S600. In step S600, the process ends. That is, subsequent to step S600, a user might prepare another query to transmit to the controller device 300.

Figure 10:
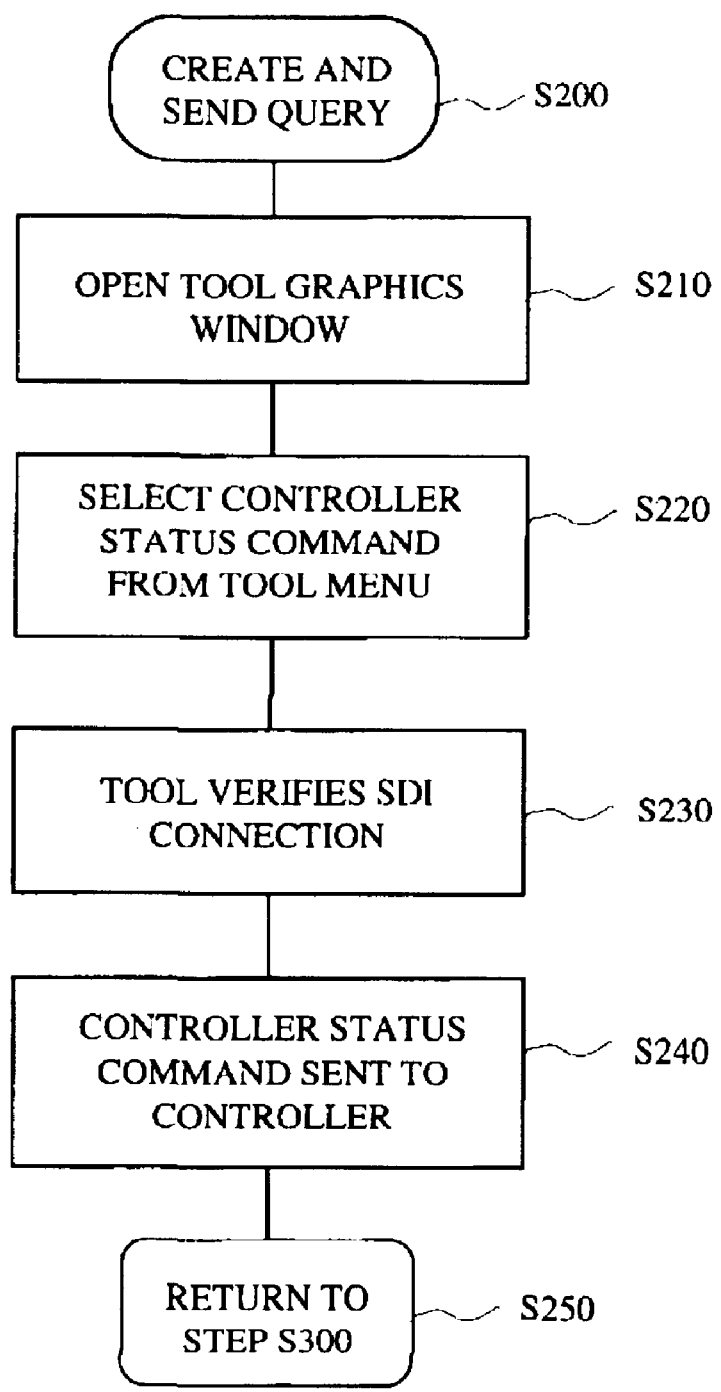
FIG. 10 is a flowchart showing further detail of the "create and send query" step of FIG. 9 in accordance with one embodiment of the system and method of the invention.

FIG. 10 is a flowchart showing in further detail the "create and send query" step of FIG. 9. After step S200, the process passes to step S210. In step S210, a user opens a tool graphics window. The tool graphics window presents menu options to the user. As one skilled in the art should appreciate, the system tool may include many programs and options with the controller diagnostics features being one option of the functionality of the system tool.

After step S210, the process passes to step S220. In step S220, the user selects a controller status command from the tool menu. That is, from a list of available menu options, the user selects the desired control status command. The available status commands may be listed in a single menu or in a hierarchical series of sub-menus, for example. The menu may include both static commands, i.e., a standard set of commands, as well as custom commands that have been prepared specifically by or for that particular user. It should be appreciated that although the two types of commands are different in type and in the manner in which each command is generated, the method of selection and subsequent processing by the system tool 100 is similar, as is described above.

A user may make the selection of a controller status command in step S220 in any of a variety of ways. Typically, methods of effecting selection of a particular command include a mouse click, a carriage return, or touching a responsive screen, for example. Accordingly, the selection from a menu typically requires a limited physical input from the user and avoids the necessity to input a text string.

Once the controller status command has been selected in step S220, the system tool verifies that a connection exists between the tool and the tool responsive data interface. For example, the data interface may be in the form of a SDI (session data interface) connection. Accordingly, in step S230, the tool verifies the SDI connection.

After step S230, the process passes to step S240.

In step S240, the controller status command is sent from the system tool to the controller. For example, the controller encapsulates the controller status command in a packet form for transmission over the Ethernet 200.

After step S240, the process passes to step S250. In step S250 as shown in FIG. 10, the process returns to step S300, as shown in FIG. 9.

Figure 11:
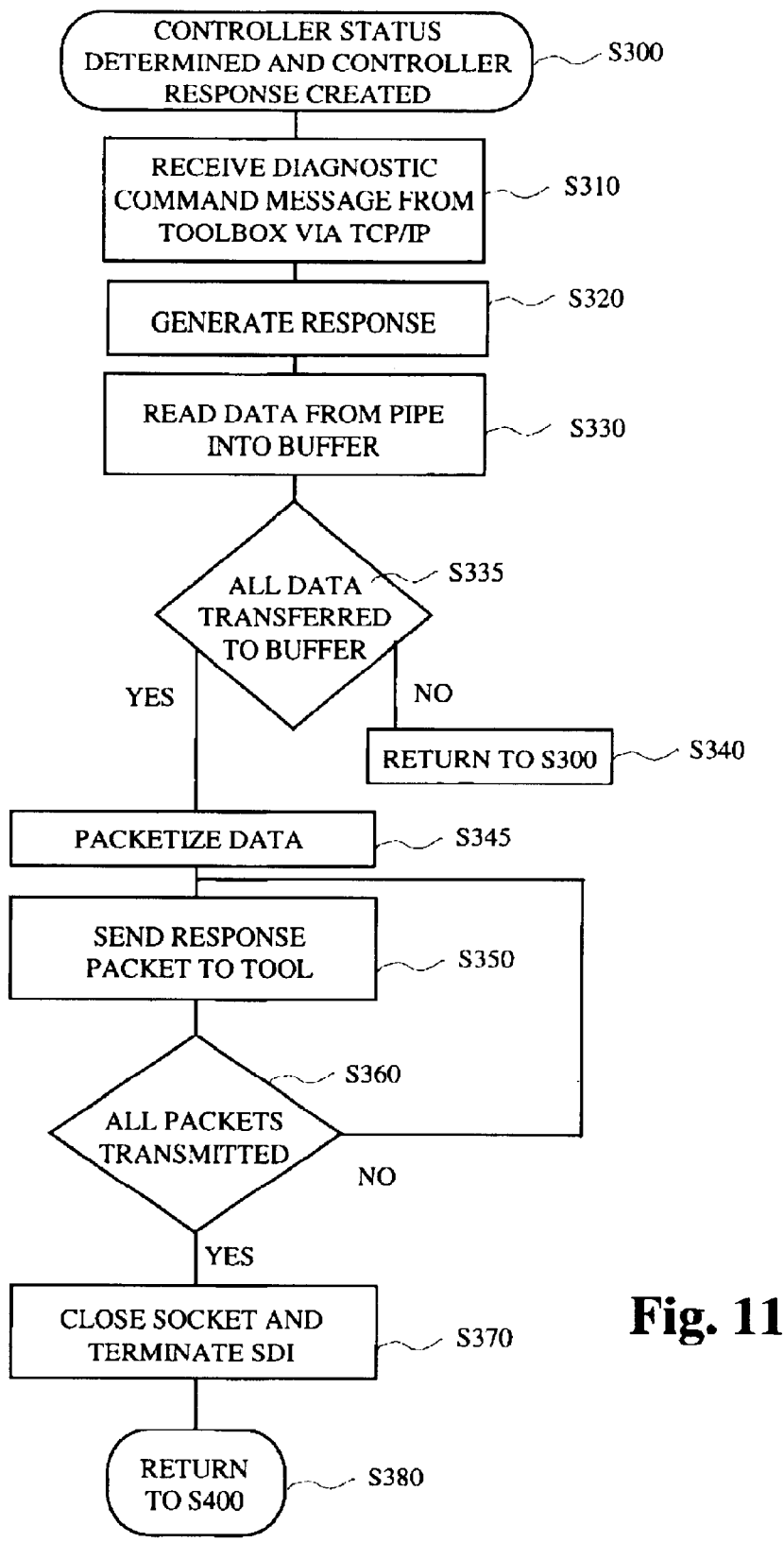
FIG. 11 is a flowchart showing further detail of the "controller status determined and the controller response created" step of FIG. 9 in accordance with one embodiment of the system and method of the invention.

FIG. 11 is a flowchart showing in further detail the "controller status determined and controller response created" step of FIG. 9. As shown in FIG. 11, the process starts in step S300. After step S300, the process passes to step S310. In step S310, the controller status command for requesting diagnostic information sent from the system tool is received by the controller responsive TCP/IP connection as shown in FIG. 1. As shown in FIG. 11, after step S310, the process passes to step S320. In step S320, the controller device generates a response. Further details of step S320 and the generation of the response are described with reference to FIG. 12 below.

After step S320, the process passes to step S330. In step S330, a controller device response is sent via the communications channel or pipe to a buffer portion of the session data interface 320 in the controller device 300. After step S330, the process passes to step S335. As shown in step S335, the controller device makes a determination if the controller response exceeds the buffer capacity, i.e., is all the data transferred to the buffer. If no, in step S335, then the process advances to step S340. In step S340, the process returns to step S220 in FIG. 10. That is, in step S220 the user attempts to select the particular diagnostic command a further time, or alternatively, selects another diagnostic command.

Alternatively, the controller may determine in step S335 that all the data has been transferred to the buffer, i.e., the entirety of the control response is transferred to the buffer. As a result, the process advances to step S345 in which the controller device packetizes the date preparing the data for transmission to the system tool 100. After step S345, the process passes to step S350.

In step S350, the packetized controller response or packet is sent to the TCP/IP socket 310 for transmission via the communications path 200. As packets are sent, the controller determines whether the last packet has been transmitted. That is, in step S360, the controller device makes a determination whether all the packets are transmitted. If no, i.e., all the packets are not transmitted, then the process returns to step S350. In step S350, the controller device again attempts to send the packets containing the response information to the system tool.

Alternatively, in step S360 the controller device may determine that all the packets are transmitted. As a result if "YES" in step S360, then the process passes to step S370. In step S370, the socket is closed and the session data interface is terminated. After step S370, the process passes to step 380. In step S380, the process returns to step S400 as shown in FIG. 9. As described above with reference to FIG. 9, in step S400 the controller response is transmitted to the tool over the Ethernet, for example. After step S400, the process advances to step S500.

Figure 12:
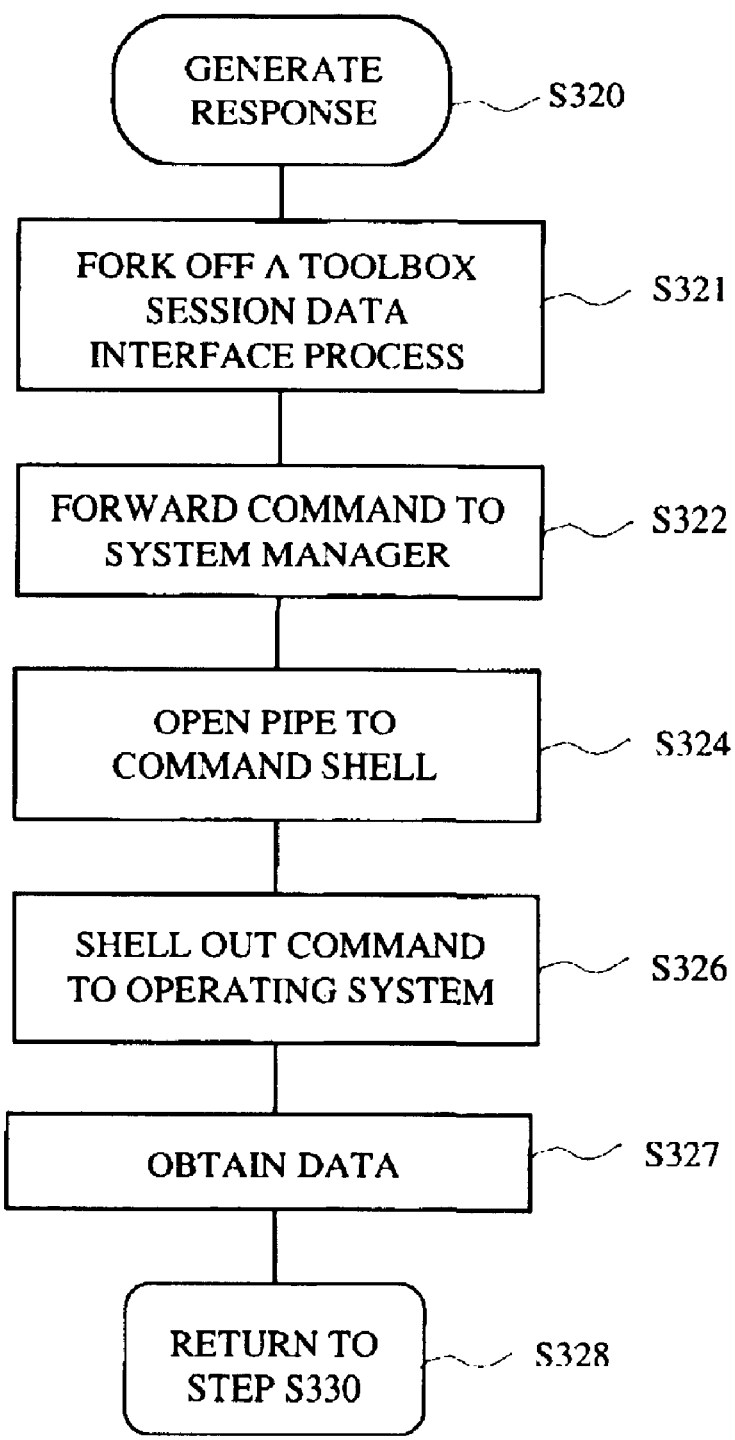
FIG. 12 is a flowchart showing further detail of the "generate response" step of FIG. 11 in accordance with one embodiment of the system and method of the invention.

As described above, in step S320 of FIG. 11, the controller device generates a response. FIG. 12 is a flowchart showing in further detail the process of generating a response. As shown in FIG. 12, generation of the response starts in step S320. After step S320, the process passes to step S321. The controller device initiates generation of a response subsequent to receipt of the query in the controller device 300. Once the query, i.e., the diagnostic command, is received, the diagnostic command is unpacked and a tool data interface process is forked off or initiated in the session data interface 320 as shown in FIG. 8. Accordingly, once the controller device forks off a tool box session data interface process in step S321 as shown in FIG. 12, the process passes to step S322. In step S322, the diagnostic command is forwarded to the system manager 330. The system manager 330 queries the designated portion of the controller device for the information requested in the diagnostic command. For example, the system manager 330 may query the shell 340, the operating system kernel 350, or the flash file system 360, for example. However, it should be appreciated that these specific components are illustrative. The system manager 330 or other suitable operational manager may query any number of components in the controller device as is necessary or desired.

As shown in step S324, the system manager 330 initiates the query by opening a pipe to the command shell 340. The use of a pipe permits simultaneous transmission of multiple bits of data. As one skilled in the art will appreciate, other types of communications channels may be utilized. Utilization of a channel such as a pipe facilitates transfer of information without interruption of function of the controller 300. In step S326 of FIG. 12, the system manager 330 shells out or sends the controller diagnostic command to the designated portion of the controller 300 to execute the query and obtain the required information as a control response. Accordingly, in step S327, the necessary data is obtained. Subsequent to step S327, the process of FIG. 12 passes to step S328. In step S328, the process returns to step S330 as shown in FIG. 11.

Figure 13:
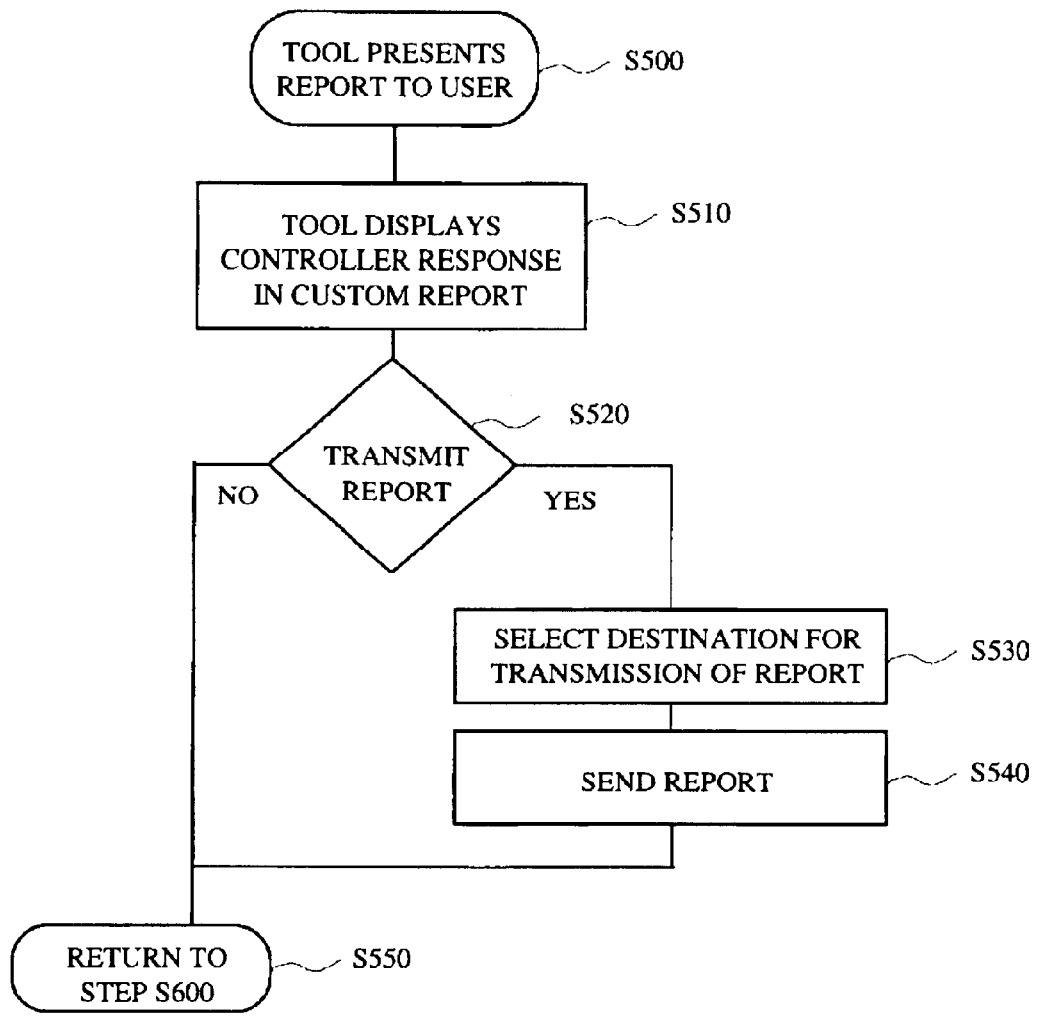
FIG. 13 is a flowchart showing further detail of the "tool presents report to user" step of FIG. 9 in accordance with one embodiment of the system and method of the invention.

As described above with reference to the flowchart of FIG. 9, in step S500 of FIG. 9, the system tool presents a report to the user. FIG. 13 is a flowchart showing in further detail the step of presenting the report to the user. As shown in FIG. 13, the process starts in step S500. After step S500, the process passes to step 5510. In step S510, the system tool displays the controller device in a custom report. Illustratively, the custom controller report may be generated by the report generation portion 123 shown in FIG. 3. This report is typically displayed as a window containing text. The report may be utilized by the user as presented by the system tool on a monitor, for example, and/or forwarded to another destination. Accordingly, in step S520, the user makes a determination whether to transmit the report or not. If the user does wish to transmit the report in step S520, i.e., yes, then the process passes to step S530. In step S530, the user selects a destination for transmission of the report in accordance with one exemplary embodiment of the method of the invention. The destination may include, for example, a printer, archival memory storage, e-mail transmission to a remote destination or a combination of such destinations. E-mail transmission is useful in troubleshooting situations as diagnostic information may be rapidly and accurately conveyed to individuals at remote sites with expertise in troubleshooting controller problems. After step S530 in FIG. 13, the process passes to step S540. In step S540, the system tool sends the report to the desired destination. The transmission of the report to the destination may be accomplished in any suitable manner. After step S540, the process passes to step S550.

Alternatively, the user may determine in step S520 that the user does not wish to transmit the report. As a result, the process passes from step S520 to step S550. In step S550, the process returns to step S600 as shown in FIG. 9. In step S600, the process ends. As described above, the system and method of the invention utilizes a user interface to interact with the human user. As used herein, a user interface includes any software, hardware or combination of hardware and software used in an operating system that allows a user to interact with the operating system. For example, a user interface may include any of a touch screen, keyboard, mouse, voice reader, voice recognizer, dialogue screen, menu box, a list, a check box, a toggle switch, a push button or any other component that allows the user to receive information regarding the operation of the operating system and/or provide the operating system with information. Accordingly, the user interface is any device that provides communication between the user and the operating system. The information provided by the user may be in the form of selection of data or other input, for example.

It should be appreciated that FIGS. 1–4 and 8 above illustrate an exemplary operating system. However, other operating systems that perform the method of the invention, as described in conjunction with FIGS. 9–13 above, may also be utilized. Further, it is to be appreciated that in the system and method of the invention it is not necessary that the components of the system tool and the controller device be physically located in the same place. That is, it should be appreciated that each of the components may be located in geographically distinct locations and connected so as to communicate in any suitable manner such as over a network, for example. Additionally, it should be appreciated that each of the processors and/or the memories utilized may be composed of different physical pieces of equipment. Accordingly, it is not necessary for the respective processors to be one single piece of equipment in one location and the memory being another single piece of the equipment in another location. That is, it is common that the processor may be two pieces of equipment in two different physical locations. The two distinct pieces of equipment may be connected in any suitable manner. Additionally, the memory may include two or more portions of memory in two or more physical locations. Further, the memory could utilize memory storage from the Internet, Intranet, Extranet, LAN or some other source or over some other network as may be necessary or desired.

As described above, the invention may illustratively be embodied in the form of a computer or computer operating system. It is to be appreciated that the software that enables the computer operations to perform their operations described herein may be supplied on any of a wide variety of data holding media. Further, it should be appreciated that a particular implementation of the invention may be in the form of computer code written in any suitable program language which provides instructions to the particular computer.

While the foregoing description includes many details and specifications, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A diagnostic system for monitoring controller performance, the diagnostic system comprising:
   a tool, wherein the tool includes a user interface that displays at least one operational status command such that a user may select the operational status command;
   a controller having an operation status wherein the at least one operational status command of the tool queries the operation status of the controller, and the controller generates at least one operational status response;
   a communications path for transmission of the at least one operational status command from the tool to the controller and the at least one operational status response from the controller to the tool; and
   wherein the user interface displays the at least one operational status response of the controller;
   wherein the operational status command is a customized operational status command, the customized operational status command being one of a set of commands created specially for a particular user or users; and
   further including a text editor portion, the text editor portion for creating the customized operational status command.

2. The diagnostic system of claim 1, wherein the user may select the at least one operational status command upon a single user action.

3. The diagnostic system of claim 1, wherein the user interface shows the operational status response in a natural language.

4. The diagnostic system of claim 1, wherein a further operational status command is a static operational status command, the static operational status command being one of a standard set of commands.

5. The diagnostic system of claim 1, wherein a further operational status command is one of a static operational status command and a customized operational status command, and wherein:
   the static operational status command being one of a standard set of commands; and
   the customized operational status command being one of a set of commands created specially for a particular user or users.

6. The diagnostic system of claim 5, wherein the further operational status command is selected from a menu.

7. The diagnostic system of claim 6, wherein the user interface displays the at least one operational status response of the controller using a display window, the window containing information relating to the operational status command and the operational status response from the controller.

8. A diagnostic system for monitoring controller performance, the diagnostic system comprising:
   a tool, wherein the tool includes a user interface that displays at least one operational status command such that a user may select the operational status command, the tool providing both static operational status commands and customized operational status commands and wherein the operational status command is one of the static operational status commands and the customized operational status commands, and wherein:
      the static operational status command being one of a standard set of commands; and
      the customized operational status command being one of a set of commands created specially for a particular user or users;
   a controller having an operation status wherein the at least one operational status command of the tool queries the operation status of the controller, and the controller generates at least one operational status response;
   a communications path for transmission of the at least one operational status command from the tool to the controller and the at least one operational status response from the controller to the tool; and
   wherein the user interface displays the at least one operational status response of the controller, the user interface showing the operational status response in natural language; and
   further including a text editor portion, the text editor portion for creating the customized operational status command.

9. The diagnostic system of claim 8, wherein the user may select the at least one operational status command upon a single user action.

10. The diagnostic system of claim 8, wherein code to effect the customized operational status command is contained in a script file in a memory portion in the tool.

11. The diagnostic system of claim 8, wherein the operational status command is selected from a menu.

12. The diagnostic system of claim 8, wherein the user interface displays the at least one operational status response of the controller using a display window, the window containing information relating to the operational status command and the at least one operational status response from the controller.

13. A method for monitoring controller performance, the method comprising the steps of:
   providing a plurality of possible operational status commands in a tool;
   selecting a selected operational status command from the plurality of possible operational status commands;
   transmitting the selected operational status command to a controller;
   executing the selected operational status command in the controller, the executing generating an operational status response in the controller;
   transmitting the operational status response to the tool; and
   displaying the operational status response in a report;
   wherein providing a plurality of possible operational status commands in a tool includes at least one of providing a static operational status command and providing a customized operational status command, and wherein:
      the static operational status command being one of a standard set of commands; and
      the customized operational status command being one of a set of commands created specially for a particular user or users; and
   wherein providing a customized operational status command includes using a text editor portion for creating the customized operational status command.

14. The method of claim 13, wherein the selecting the selected operational status command includes a user selecting the selected operational status command from a menu upon a single user action.

15. The method of claim 13, further including the step of sending the operational status response to a remote location from the tool.

16. The method of claim 15, wherein e-mail is used to send the operational status response to the remote location.

17. The method of claim 13, wherein the report is generated on a user interface such that a user may view the report.

18. The method of claim 17, wherein the report is provided in a natural language.

19. A method for monitoring controller performance, the method comprising the steps of:
   providing a plurality of possible operational status commands in a tool;
   selecting a selected operational status command from the plurality of possible operational status commands, wherein the selecting the selected operational status command includes a user selecting the selected operational status command from a menu upon a single user action;
   transmitting the selected operational status command to a controller;
   executing the selected operational status command in the controller, the executing generating an operational status response in the controller;
   transmitting the operational status response to the tool; and
   displaying the operational status response in a report on a user interface;
   wherein providing a plurality of possible operational status commands in a tool includes at least one of providing a static operational status command and providing a customized operational status command, and wherein:
      the static operational status command being one of a standard set of commands; and
      the customized operational status command being one of a set of commands created specially for a particular user.

20. The method of claim 19, wherein the report is provided in a natural language.

21. A system for monitoring controller performance, the system comprising:
   means for providing a plurality of possible operational status commands in a tool;
   means for selecting a selected operational status command from the plurality of possible operational status commands;
   means for transmitting the selected operational status command to a controller;
   means for executing the selected operational status command in the controller, the executing generating an operational status response in the controller;

means for transmitting the operational status response to the tool; and means for displaying the operational status response in a report; and wherein the means for providing a plurality of possible operational status commands in a tool includes means for providing a static operational status command and means for providing a customized operational status command, and wherein:

the static operational status command being one of a standard set of commands; and the customized operational status command being one of a set of commands created specially for a particular user or users.

22. The system of claim 21, wherein the means for providing a plurality of possible operational status commands in a tool includes means for providing a static operational status command and means for providing a customized operation status command, and wherein:

the static operational status command being one of a standard set of commands; and the customized operational status command being one of a set of commands created specially for a particular user or users.

23. A diagnostic system for monitoring controller performance, the diagnostic system comprising:

a tool, wherein the tool includes a user interface that displays at least one operational status command such that a user may select the operational status command;

a controller having an operation status wherein the at least one operational status command of the tool queries the operation status of the controller, and the controller generates at least one operational status response;

a communications path for transmission of the at least one operational status command from the tool to the controller and the at least one operational status response from the controller to the tool; and wherein the user interface displays the at least one operational status response of the controller;

wherein the operational status command is a customized operational status command, the customized operational status command being one of a set of commands created specially for a particular user or users; and wherein code to effect the customized operational status command is contained in a script file in a memory portion in the tool.

24. A diagnostic system for monitoring controller performance, the diagnostic system comprising:

a tool, wherein the tool includes a user interface that displays at least one operational status command such that a user may select the operational status command;

a controller having an operation status wherein the at least one operational status command of the tool queries the operation status of the controller, and the controller generates at least one operational status response;

a communications path for transmission of the at least one operational status command from the tool to the controller and the at least one operational status response from the controller to the tool; and wherein the user interface displays the at least one operational status response of the controller;

wherein the operational status command is a customized operational status command, the customized operational status command being one of a set of commands created specially for a particular user or users; and wherein the tool includes a query generation portion, the query generation portion for creating the customized operational status commands.

25. A diagnostic system for monitoring controller performance, the diagnostic system comprising:

a tool, wherein the tool includes a user interface that displays at least one operational status command such that a user may select the operational status command, the tool providing both static operational status commands and customized operational status commands and wherein the operational status command is one of the static operational status commands and the customized operational status commands, and wherein:

the static operational status command being one of a standard set of commands; and the customized operational status command being one of a set of commands created specially for a particular user or users;

a controller having an operation status wherein the at least one operational status command of the tool queries the operation status of the controller, and the controller generates at least one operational status response;

a communications path for transmission of the at least one operational status command from the tool to the controller and the at least one operational status response from the controller to the tool; and wherein the user interface displays the at least one operational status response of the controller, the user interface showing the operational status response in natural language; and wherein the user interface displays the at least one operational status response of the controller using a display window, the window containing information relating to the operational status command and the at least one operational status response from the controller.

26. A method for monitoring controller performance, the method comprising the steps of:

providing a plurality of possible operational status commands in a tool;

selecting a selected operational status command from the plurality of possible operational status commands;

transmitting the selected operational status command to a controller;

executing the selected operational status command in the controller, the executing generating an operational status response in the controller;

transmitting the operational status response to the tool; and displaying the operational status response in a report; and wherein providing a plurality of possible operational status commands in a tool includes at least one of providing a static operational status command and providing a customized operational status command, and wherein:

the static operational status command being one of a standard set of commands; and the customized operational status command being one of a set of commands created specially for a particular user or users; and wherein providing a customized operational status command includes receiving a communication containing code for the customized operational status command and inserting the received code into a custom script file in the tool.

* * * * *